J. & J. L. FAGAN.
Corn Husker.
No. 19,552.
Patented March 9, 1858.
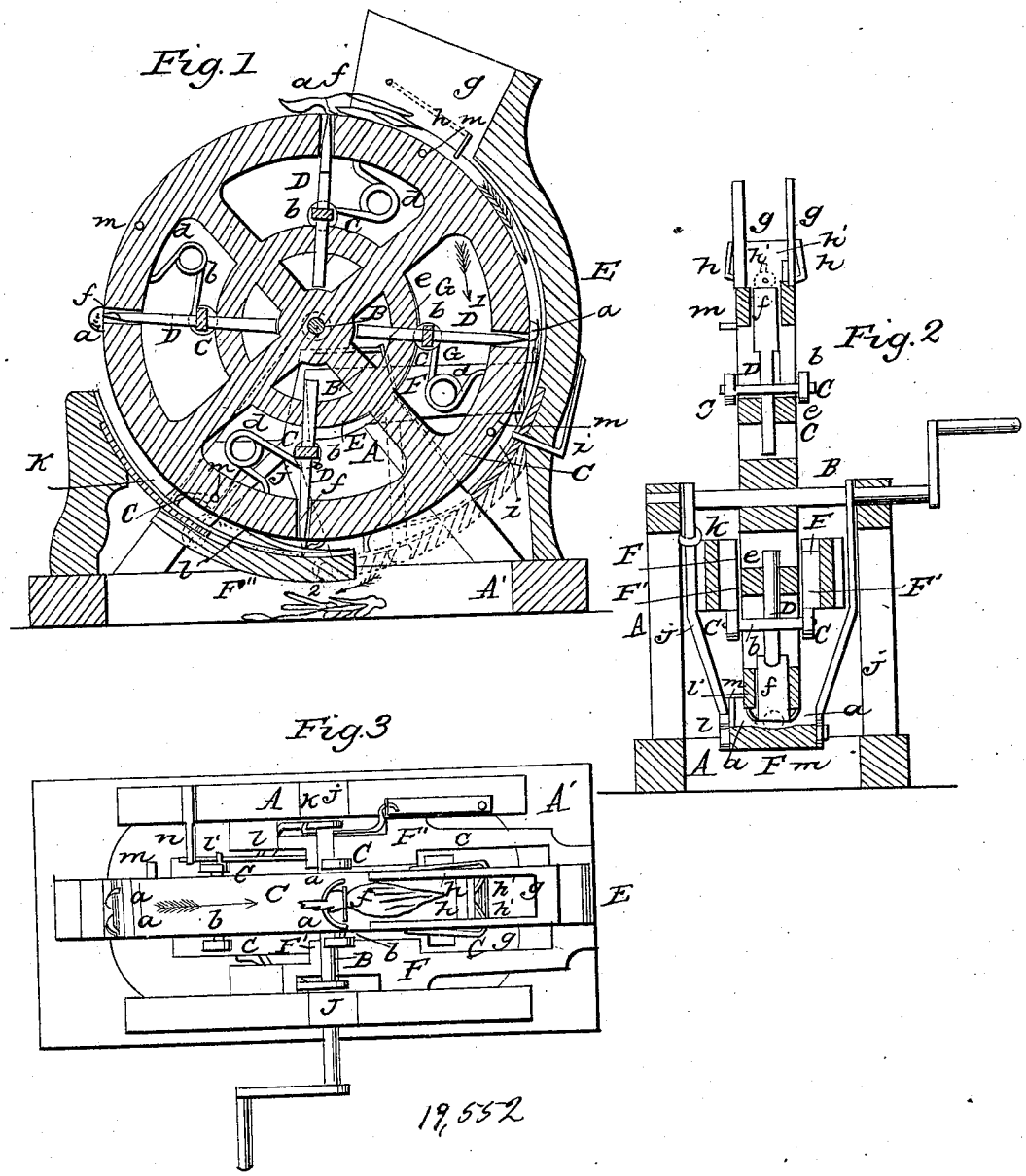

UNITED STATES PATENT OFFICE.

JOSEPH FAGAN AND JAMES L. FAGAN, OF SAN ANTONIO RIVER, TEXAS.

CORN-HUSKER.

Specification of Letters Patent No. 19,552, dated March 9, 1858.

*To all whom it may concern:*

Be it known that we, JOSEPH FAGAN and JAMES L. FAGAN, both of San Antonio River, in the county of Refugio and State of Texas, have invented a new and Improved Machine for Husking Corn; and we do hereby declare that the following is a full, clear, and exact description of the same, reference being had to the annexed drawings, making a part of this specification, in which—

Figures 1 and 2, are vertical central sections of our improvement, the two planes of section crossing each other at right angles. Fig. 3, is a plan or top view of ditto.

Similar letters of reference indicate corresponding parts in the several figures.

This invention consists in the employment or use of a rotating wheel provided with cutters and spurs or projections, in connection with two concaves, a stationary and vibrating one, the stationary concave being provided with slitting hooks, the whole being arranged as hereinafter shown so as to perform the desired work in an expeditious and perfect manner.

To enable those skilled in the art to fully understand and construct our invention we will proceed to describe it.

A represents a frame in the upper part of which a horizontal shaft B, is placed. C is a wheel placed on said shaft. This wheel may be of any proper size. It has a series of spurs or projections (*a*) attached to its periphery at suitable and equal distances apart. These spurs or projections are arranged in pairs and placed in oblique positions so as to form concave prominences approximating to a semi-circular form as shown clearly in Fig. 3. In the wheel C, a series of burs D are placed radially. These burs are allowed to slide or work longitudinally in the wheel and each bur has a cross piece (*b*) attached, said burs having a friction roller (*c*) at each end. A spring (*d*) bears upon the cross piece (*b*) of each bur. These springs have a tendency to keep said crosspieces in contact with the outer surface of a concentric rim or flanch (*e*) formed or placed in the wheel C. On the outer end of each bur D a cutter (*f*) is formed. These cutters are of ordinary chisel form, and may have their cutting edges formed by a bezel on one or both sides. The cutting edges of the cutters are flush with the periphery of the wheel C, when the cross pieces are in contact with the rim or flanch (*e*). The cutters are fitted in the periphery of the wheel by the side of the spurs or projections (*a*), a cutter being by the side of each pair of projections, and in line with their outer ends. See Fig. 3.

E, is a concave which is placed near the periphery of the wheel C, at one side. This concave is concentric with the wheel, and its lower end is attached to two bars F, F, which are secured to the frame A, one at each side of the wheel C, and to the base A′, of the frame. The concave E may extend around about one quarter of the periphery of the wheel C, and sufficient space is allowed between the concave and wheel to allow the ears of corn to pass down between them. To the upper end of the concave E, two parallel side pieces (*g*), (*g*), are attached, one to each side. These side pieces form a hopper to receive the ears of corn, shown in red. To each side piece (*g*) a spring (*h*) is attached. These springs may be formed of steel rods having one end bent so as to pass through the side pieces at their junction with the concave E. The bent ends of the rods are sharpened or brought to an edge so as to form cutters (*h*′) and the bent ends of the rods are allowed to work freely through the side pieces (*g*), (*g*). A similar spring or rod (*i*) with cutter (*i*′) formed on it is attached to the lower end of the concave as shown clearly in Fig. 1. The concave E, is grooved at its inner side so as to retain the ears of corn or prevent their lateral escape from between the concave and wheel.

F″, is a concave constructed precisely similar to the concave E. This concave is attached to radial arms (*j*), (*j*), which are hung loosely on the shaft B. The upper part of one of the arms (*j*) is connected by a link (*k*) to a spring G, attached to the frame A, said spring having a tendency to keep the concave F, adjoining the lower end of concave E. To the concave F″, a spring catch (*l*) is attached. This catch is merely a piece of steel rod bent so as to form a catch or shoulder (*l*′) at its outer end and allowed in consequence of its elasticity to yield or give so as to free itself from pins (*m*) on one side of the wheel A, the spring being depressed so as to be free from said pins in consequence of striking against a projecting bar (n) attached to the frame A.

On the inner side of each side piece F, a cam F', is formed.

The operation is as follows:—The ears of corn in the husk are placed in the hopper formed by the two side pieces (g) (g) and the wheel C, is rotated in the direction indicated by arrow 1. The ears of corn are carried down one at a time, tops or points foremost, between the periphery of the wheel C and the concave E in consequence of the projections (a) pressing against the butts of the ears. The ears have their husks slitted longitudinally by the cutters (h') at the upper end of the concave E, and they are also slitted by the cutter (i') at the lower end of the concave. The ears with their husks thus slitted pass into the concave F'', which as soon as it receives an ear is moved outward from the lower end of the concave E, as indicated by arrow 2, in consequence of one of the pins (m) striking the spring catch (l') and during this movement of the concave the cutter (f) which is by the side of the spurs or projections which forces or carries the ear downward is shoved outward by the cams F', and the butt is severed from the ear as shown in red Fig. 1, the concave F'' and ear moving of course with the same speed as the wheel while the butt is being severed from the ear, when the concave F'', has reached a certain point and the cutter (f) has been forced outward to its fullest extent the spring catch (c) will strike the bar (a) and be depressed so as to be free from the pin (m) which actuates the concave F'', and said concave will therefore be thrown back to its original position by the spring G and ready to receive a succeeding ear. When the butts are severed from the ears the husks being previously slitted as described the husks drop from the ear as the concave is moved back to receive a succeeding ear, the husked ear also dropping from said concave.

Any desired number of cutters and projections (a) may be used according to the size of the wheel C.

This machine will operate quite rapidly and is not liable to become choked or clogged. It cannot readily get out of repair and may be constructed at a moderate cost.

Having thus described our invention what we claim as new and desire to secure by Letters Patent, is—

The rotating wheel C, provided with spurs or projections (a) and with cutters (f) actuated by the cams F', or their equivalents in combination with the stationary and movable concaves E, F'', the whole being arranged to operate substantially as and for the purpose set forth.

JOSEPH FAGAN.
JAMES L. FAGAN.

Witnesses:
  John Smith,
  J. M. Doughty.